US012645484B2

(12) United States Patent
Takazawa et al.

(10) Patent No.: US 12,645,484 B2
(45) Date of Patent: Jun. 2, 2026

(54) VEHICLE-MOUNTED COMPUTER, COMPUTER EXECUTION METHOD, AND COMPUTER PROGRAM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Tadahiro Takazawa, Yokkaichi (JP); Koji Yasuda, Yokkaichi (JP)

(73) Assignees: Auto Networks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 403 days.

(21) Appl. No.: 18/259,050

(22) PCT Filed: Dec. 10, 2021

(86) PCT No.: PCT/JP2021/045436
§ 371 (c)(1),
(2) Date: Jun. 22, 2023

(87) PCT Pub. No.: WO2022/138218
PCT Pub. Date: Jun. 30, 2022

(65) Prior Publication Data
US 2024/0054002 A1 Feb. 15, 2024

(30) Foreign Application Priority Data
Dec. 23, 2020 (JP) .................................. 2020-213796

(51) Int. Cl.
*G06F 9/455* (2018.01)
*G07C 5/00* (2006.01)

(52) U.S. Cl.
CPC ......... *G06F 9/45558* (2013.01); *G07C 5/008* (2013.01); *G06F 2009/4557* (2013.01)

(58) Field of Classification Search
CPC ......... G06F 9/45558; G06F 2009/4557; G07C 5/008
See application file for complete search history.

(56) References Cited

FOREIGN PATENT DOCUMENTS

| JP | 2008-217302 A | 9/2008 |
| JP | 2014-203232 A | 10/2014 |
| (Continued) |

OTHER PUBLICATIONS

International Search Report, Application No. PCT/JP2021/045436, mailed Jan. 11, 2022. ISA/Japan Patent Office.

*Primary Examiner* — Eric Cardwell
(74) *Attorney, Agent, or Firm* — Brooks Kushman P.C.

(57) ABSTRACT

In a vehicle-mounted computer that includes a physical resource including a processor with a plurality of cores and a physical device with a register and generates a plurality of virtual devices by allocating the physical resource through time-division, the processor causes at least one virtual device of the plurality of virtual devices to operate on each of the plurality of cores periodically at a predetermined period and causes another virtual device of the plurality of virtual devices to operate non-periodically, stores the core on which the other virtual device operated, and determines the core on which the other virtual device is to operate, based on whether or not the core on which the other virtual device is to operate will be changed and a change amount of a register value of the physical device.

13 Claims, 11 Drawing Sheets

(56) References Cited

FOREIGN PATENT DOCUMENTS

| JP | 2019-139453 A | 8/2019 |
| JP | 2019-212032 A | 12/2019 |

| Virtual Device | First Physical Device | Second Physical Device | Third Physical Device | Core Used In Previous Execution |
|---|---|---|---|---|
| VM[0] | A_0 | B_0 | Not Applicable | First Core |
| VM[1] | A_0 | B_0 | C_0 | First Core |
| VM[2] | A_0 | B_1 | Not Applicable | Second Core |
| ... | ... | ... | ... | ... |

FIG. 6A

Setting Of Second Physical Device: B_0

| Identifier (Address) | Setting Value |
|---|---|
| Identifier (Address) | XXXX |
| 0x4000_004 | YYYY |
| 0x4000_008 | ZZZZ |

FIG. 6B

Setting Of Second Physical Device: B_1

| Identifier (Address) | Setting Value |
|---|---|
| 0x4000_000 | AAAA |
| 0x4000_004 | BBBB |
| 0x4000_008 | CCCC |

FIG. 10

| | Migration | Device Setting Change | Processing Time for Context Switching, Etc. |
|---|---|---|---|
| Execute VMa on First Core | No | Large | T1 |
| Execute VMa on Second Core | Yes | Small | T2 |

FIG. 11

VEHICLE-MOUNTED COMPUTER, COMPUTER EXECUTION METHOD, AND COMPUTER PROGRAM

CROSS-REFERENCE TO RELATED APPLICATIONS

This application is the U.S. national stage of PCT/JP2021/045436 filed on Dec. 10, 2021, which claims priority of Japanese Patent Application No. JP 2020-213796 filed on Dec. 23, 2020, the contents of which are incorporated herein.

TECHNICAL FIELD

This disclosure relates to a vehicle-mounted computer, a computer execution method, and a computer program.

BACKGROUND

Vehicles have installed therein a plurality of electronic control units (ECUs: Electronic Control Units, hereinafter referred to as ECUs) connected to a vehicle-mounted network. In recent years, the number of ECUs installed in vehicles has been increasing as vehicles become more sophisticated with the introduction of Advanced Driver-Assistance Systems (ADAS), autonomous driving technology, and artificial intelligence technology. In addition, it is becoming necessary to closely link ECUs that are prepared for different functions, such as power train, body, and chassis systems.

Therefore, consideration has been given to integrating and aggregating the functions of a plurality of ECUs each with a different function, into a specific vehicle-mounted computer. The vehicle-mounted computer integrates the functions of the various ECUs, for example, by generating each ECU as a virtual device using virtualization technology and executing programs for realizing the functions of each ECU on the virtual device (e.g., JP 2019-139453A).

The processor of the vehicle-mounted computer schedules tasks relating to the virtual devices, which reproduce the plurality of ECUs and to programs on the virtual devices, and switches and executes tasks relating to each virtual device.

When an ECU has a processor with a plurality of cores installed therein, it is necessary to select the cores on which the virtual devices are to operate, especially those that operate non-periodically. Generally, a processing load is generated if a virtual device is migrated from one core on which it was operating the previous time, to another core.

As for embedded processors, such as those installed on ECUs, when switching virtual devices that are to operate, the states of a plurality of physical devices, such as SCBs (System Control Block), MPUs (Memory Protection Unit), MMUs (Memory Management Unit), MPCs (Memory Protection Controller), and other peripherals, that is, the register values of the physical devices, must also be changed, and thus a processing load is generated.

However, the conventional technique does not disclose a technique for selecting cores on which virtual devices are to be operate with consideration given to the processing load for migrating virtual devices and performing a setting change of the register values of the physical devices.

An object of the present disclosure is to provide a vehicle-mounted computer, a computer execution method, and a computer program capable of selecting a core on which a virtual device is to operate with consideration given to the processing load relating to the migration of virtual devices and the processing load relating to performing a setting change of the register values of the physical devices.

SUMMARY

A vehicle-mounted computer according to one aspect of the present disclosure is a vehicle-mounted computer that includes a physical resource including a processor with a plurality of cores and a physical device with a register and generates a plurality of virtual devices by allocating the physical resource through time-division, in which the processor causes at least one virtual device of the plurality of virtual devices to operate on each of the plurality of cores periodically at a predetermined period and causes another virtual device of the plurality of virtual devices to operate non-periodically; stores at least the core on which the other virtual device operated; and determines, if the other virtual device is to operate next, the core on which the other virtual device is to operate, based on whether or not the core on which the other virtual device is to operate will be changed and a change amount of a register value of the physical device.

A computer execution method according to one aspect of the present disclosure is a computer execution method to be performed by a vehicle-mounted computer that includes a physical resource including a processor with a plurality of cores and a physical device with a register and generates a plurality of virtual devices by allocating the physical resource through time-division, the method including: causing at least one virtual device of the plurality of virtual devices to operate on each of the plurality of cores periodically at a predetermined period and causing another virtual device of the plurality of virtual devices to operate non-periodically; storing at least the core on which the other virtual device operated; and determining, if the other virtual device is to be caused to operate next, the core on which the other virtual device is to operate, based on whether or not the core on which the other virtual device is to operate will be changed and a change amount of a register value of the physical device.

A computer program according to one aspect of the present disclosure is a computer program for causing a vehicle-mounted computer, that includes a physical resource including a processor with a plurality of cores and a physical device with a register and generates a plurality of virtual devices by allocating the physical resource through time-division, to execute processing for: causing at least one of the plurality of virtual devices to operate on each of the plurality of cores periodically at a predetermined period and causing another virtual device of the plurality of virtual devices to operate non-periodically; storing at least the core on which the other virtual device operated; and determining, if the other virtual device is to be caused to operate next, the core on which the other virtual device is to operate, based on whether or not the core on which the other virtual device is to operate will be changed and a change amount of a register value of the physical device.

Note that not only can the present application be implemented as a vehicle-mounted computer including such a characteristic processor, but as described above, it can also be implemented as a computer execution method including steps of that characteristic processing, and a computer program for causing a computer to perform these steps. Moreover, it may be implemented as a semiconductor integrated circuit that implements part of or the entire vehicle-mounted computer or as some other system that includes the vehicle-mounted computer.

In light of the above, it is possible to provide a vehicle-mounted computer, a computer execution method, and a computer program capable of selecting a core on which a virtual device is to be operated with consideration given to the processing load relating to the migration of virtual devices and the processing load relating to performing a setting change of the register values of the physical devices.

BRIEF DESCRIPTION OF DRAWINGS

FIG. 5 is a conceptual diagram showing an example of a device configuration table.

FIG. 6A is a conceptual diagram showing an example of setting values of a second physical device.

FIG. 6B is a conceptual diagram showing an example of setting values of the second physical device.

FIG. 7 is a functional block diagram relating to context switching and the like.

FIG. 10 is a chart showing a processing load relationship.

FIG. 11 is an explanatory view showing a method of scheduling.

DETAILED DESCRIPTION OF PREFERRED EMBODIMENTS

Figure 1:
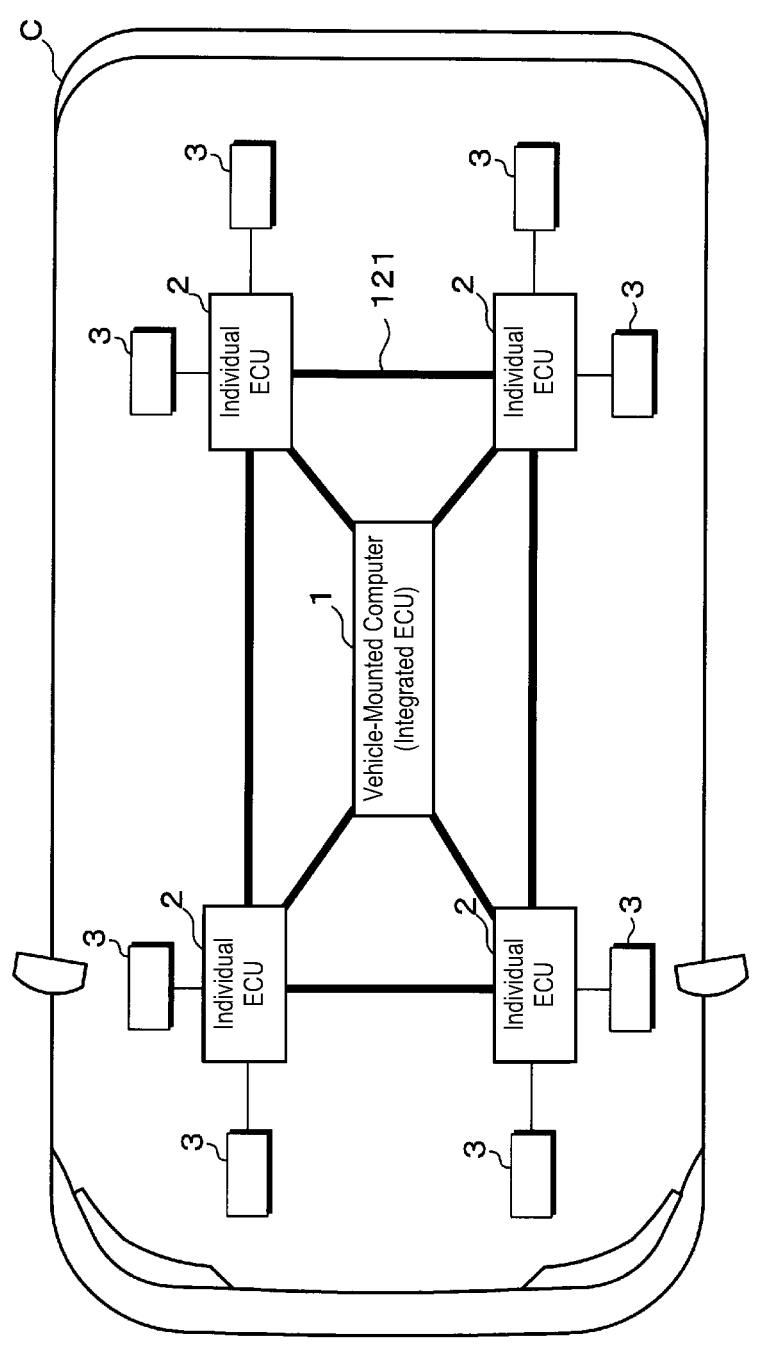
FIG. 1 is a block diagram showing a network configuration of a vehicle-mounted communication system.

First, embodiments of the present disclosure will be listed and described. Furthermore, at least portions of the embodiments described below may be combined as desired.

A vehicle-mounted computer according to one aspect of the present disclosure is a vehicle-mounted computer that includes a physical resource including a processor with a plurality of cores and a physical device with a register and generates a plurality of virtual devices by allocating the physical resource through time-division, in which the processor causes at least one virtual device of the plurality of virtual devices to operate on each of the plurality of cores periodically at a predetermined period and causes another virtual device of the plurality of virtual devices to operate non-periodically; stores at least the core on which the other virtual device operated; and determines, if the other virtual device is to operate next, the core on which the other virtual device is to operate, based on whether or not the core on which the other virtual device is to operate will be changed and a change amount of a register value of the physical device.

In the present aspect, when performing context switching for a virtual device that operates non-periodically, it is possible to determine the core on which the virtual device is to operate based on whether or not the core on which the virtual device is to operate will be changed and the change amount of the register value of the physical device.

Accordingly, it is possible to perform context switching for the virtual device with consideration given to whether or not the virtual device is to be migrated from one core to another and the change amount of the register value of the physical device, that is, with consideration given to the respective processing.

A vehicle-mounted computer according to one aspect of the present disclosure preferably has a configuration in which the processor causes the other virtual device to operate after causing the at least one virtual device to operate in the predetermined period.

In the present aspect, the virtual device that is to be caused to operate periodically at a predetermined period operates first. Then, the processor can determine the context switching destination of the virtual device that can operate non-periodically, with consideration given to whether or not migration will occur and the change amount of the register value of the physical device in the state of the virtual device that operated last.

A vehicle-mounted computer according to one aspect of the present disclosure preferably has a configuration further including a device configuration table that includes register values set in the physical device used by each of the plurality of virtual devices, and information indicating the cores on which the plurality of virtual devices operated, in which by referring to the device configuration table, the processor determines the core with the smallest total sum of a processing cost needed for changing the register values of the physical device and a processing cost needed for changing the core on which the virtual device is to operate, as the core on which the other virtual device is to operate.

In the present aspect, it is possible to determine, by referring to the device configuration table, the context switching destination with the smallest total sum of the processing cost needed for changing the register values of the physical devices and the processing cost needed for changing the core on which the virtual device is to operate.

A vehicle-mounted computer according to one aspect of the present disclosure preferably has a configuration further including a storage unit for storing processing time needed for changing the register value of the physical device and processing time needed for changing the core on which the virtual device is to operate, in which the processor determines the core with the smallest total sum of processing time needed for changing the register values of the physical device and processing time needed for changing the core on which the virtual device is to operate, as the core on which the other virtual device is to operate.

In the present aspect, it is possible to determine the context switching destination with the smallest total sum of the processing cost needed for changing the register value of the physical device and the processing cost needed for changing the core on which the virtual device is to operate.

A vehicle-mounted computer according to one aspect of the present disclosure preferably has a configuration in which the virtual device that is caused to operate periodically is a device that handles a function or data associated with an ASIL (Automotive Safety Integrity Level), and the virtual device that is caused to operate non-periodically is a device that handles a function or data associated with a QM (Quality Management) level.

In the present aspect, the processor periodically operates the virtual devices that handle functions or data associated with the ASIL, and non-periodically operates the virtual device that handles functions or data associated with the QM. When performing context switching for the virtual device that handles functions or data associated with the QM, the processor determines the core on which the virtual device is operated based on whether or not the core on which the virtual device is operated will be changed and an amount of change in register values of the physical devices.

A computer execution method according to one aspect of the present disclosure is a computer execution method to be performed by a vehicle-mounted computer that includes a physical resource including a processor with a plurality of cores and a physical device with a register and generates a plurality of virtual devices by allocating the physical resource through time-division, the method including: causing at least one virtual device of the plurality of virtual devices to operate on each of the plurality of cores periodically at a predetermined period and causing another virtual device of the plurality of virtual devices to operate non-periodically; storing at least the core on which the other virtual device operated; and determining, if the other virtual device is to be caused to operate next, the core on which the other virtual device is to operate, based on whether or not the core on which the other virtual device is to operate will be changed and a change amount of a register value of the physical device.

According to the present aspect, as in aspect (1), it is possible to perform context switching for a virtual device with consideration given to whether or not the virtual device will migrate from one core to another and the change amount of the register value of the physical device.

A computer program of one aspect of the present disclosure is A computer program for causing a vehicle-mounted computer, that includes a physical resource including a processor with a plurality of cores and a physical device with a register and generates a plurality of virtual devices by allocating the physical resource through time-division, to execute processing for: causing at least one of the plurality of virtual devices to operate on each of the plurality of cores periodically at a predetermined period and causing another virtual device of the plurality of virtual devices to operate non-periodically; storing at least the core on which the other virtual device operated; and determining, if the other virtual device is to be caused to operate next, the core on which the other virtual device is to operate, based on whether or not the core on which the other virtual device is to operate will be changed and a change amount of a register value of the physical device.

According to the present aspect, as in aspect (1), it is possible to perform context switching for a virtual device with consideration given to whether or not the virtual device will migrate from one core to another and the change amount of the register value of the physical device.

A vehicle-mounted computer, a computer execution method, and a computer program according to embodiments of the present disclosure will be described hereinafter with reference to the drawings. The present disclosure is not limited by these examples but is indicated by the claims, and all changes that come within the claims and the meaning and range of equivalency of the claims are intended to be encompassed within the scope of the disclosure. Furthermore, at least portions of the embodiments described below may be combined as appropriate.

Figure 2:
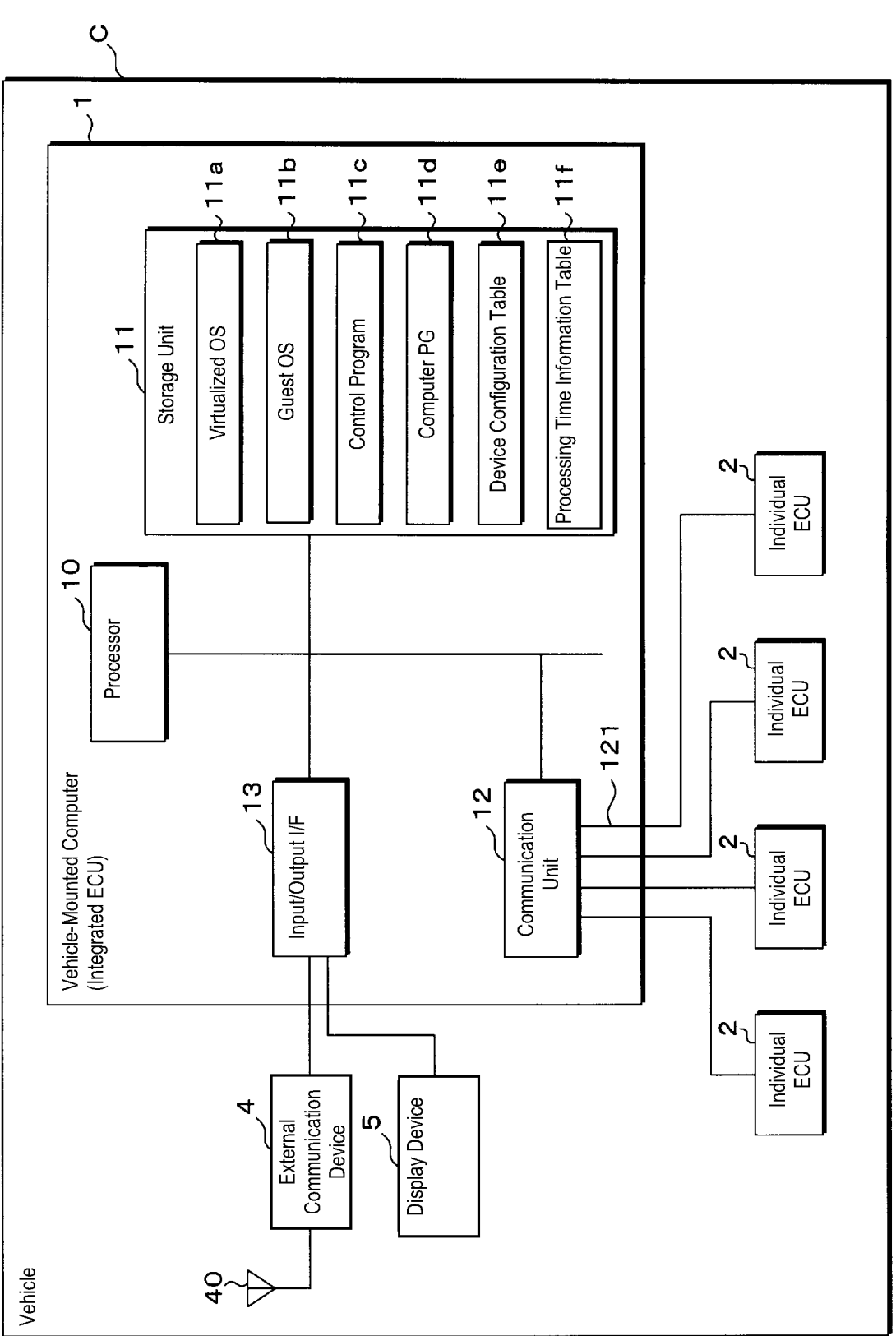
FIG. 2 is a block diagram showing an example of a configuration of the vehicle-mounted communication system.

The present disclosure will be specifically described hereinafter with reference to the drawings that show embodiments thereof. FIG. 1 is a block diagram showing a network configuration of a vehicle-mounted communication system, and FIG. 2 is a block diagram showing an example of the configuration of the vehicle-mounted communication system.

The vehicle-mounted communication system of the present embodiment includes a vehicle-mounted computer 1, a plurality of individual ECUs 2, devices 3 connected to these individual ECUs 2, an external communication device 4, and a display device 5. Each of the plurality of individual ECUs 2 is connected to the vehicle-mounted computer 1 by a vehicle-mounted communication line 121.

The vehicle-mounted computer 1 includes a multi-core processor 10, a storage unit 11, a communication unit 12, and an input/output I/F 13. The vehicle-mounted computer 1 will also be referred to as an integrated ECU.

The storage unit 11 is a non-volatile memory device, such as flash memory, EEPROM (Electrically Erasable Programmable Read Only Memory), or the like. The storage unit 11 stores a virtualized operating system (virtualized OS) 11a, a guest OS 11b, a control program 11c, a computer program (computer PG) 11d of the present embodiment, a device configuration table lie, a processing time information table 11f, and other various data necessary for the operation of the processor 10.

he virtualized operating system 11a is, for example, a hypervisor. The virtualized operating system 11a has the function of constructing a plurality of virtual environments that operate as virtual devices VM (see FIG. 4) on the virtualized operating system 11a. The virtual environments, i.e., the virtual devices VM, include a virtual processor, a virtual storage unit, a virtual communication unit, and the like that are generated by allocating physical resources, including the processor 10, the storage unit 11, the communication unit 12, and the like through time-division, and operate as virtual ECU hardware.

The plurality of virtual devices VM have priority levels for the execution of processing related to these devices. The storage unit 11 stores the priority level of each virtual device VM. The virtual devices VM bearing the responsibility of performing processing that requires responsiveness, such as safety-related processing and processing related to events, have high priority levels. The virtual devices VM with high priority levels operate periodically at a predetermined period. In other words, the virtual devices VM with high priority levels operate in real time.

The virtual devices VM bearing the responsibility of performing processing that does not require responsiveness, such as functions related to diagnostics, have low priority levels. The virtual devices VM with low priority levels operate non-periodically. In other words, virtual devices VM with low priority levels operate in non-real time.

The guest OS 11b is an OS for operating the virtual devices VM generated by the virtualized operating system 11a. The guest OS 11b is installed on the virtual devices VM with virtual hardware and functions as the basic OS for the virtual devices VM. The guest OS 11b is, for example, AUTOSAR OS, Linux (registered trademark), Android (registered trademark), QNX (registered trademark), Ubuntu (registered trademark), or the like.

The control program 11c is a program that runs on the guest OS 11b of each virtual device VM to reproduce the functions of the ECUs (not shown) integrated in the vehicle-mounted computer 1.

The virtual devices VM reproduce the functions of real physical ECUs by running the guest OS 11b and the control program 11c on these pieces of virtual hardware. In other words, the virtual devices VM operate like ECUs connected to the vehicle-mounted communication lines 121.

The computer program 11d is a program for performing the computer processing method according to the present embodiment. Note that the computer program 11d may be integrated into the virtualized OS 11*a*. The device configuration table lie and the processing time information table 11*f* will be described in detail below.

Note that the above programs may be written to the storage unit 11 at the manufacturing stage of the vehicle-mounted computer 1, or the vehicle-mounted computer 1 may acquire the above programs delivered from an external server device (not shown) and write them in the storage unit 11. It will also suffice if the vehicle-mounted computer 1 reads the above various programs recorded on a computer-readable recording medium, such as a memory card or optical disk, and writes them in the storage unit 11.

The above various programs may be provided in the form of delivery over a network as described above, or as recorded on a recording medium.

The processor 10 reads and executes the virtualized operating system 11*a*, the guest OS 11*b*, the control program 11*c*, the computer program 11*d*, the device configuration table lie, the processing time information table 11*f*, and the like stored in the storage unit 11 to perform various computing operations and performs the computer execution method according to the present embodiment.

The communication unit 12 is, for example, an Ethernet (registered trademark) PITY unit that communicates in accordance with a communication protocol, such as 100BASE-T1 or 1000BASE-T1. Note that Ethernet (registered trademark) is an example, and that the communication unit 12 may be a communication circuit that communicates according to a communication protocol, such as CAN (Controller Area Network), CAN-FD, FlexRay (registered trademark), CXPI (Clock Extension Peripheral Interface), LIN (Local Interconnect Network), or the like.

A plurality of individual ECUs 2 is connected to the communication unit 12 via the vehicle-mounted communication lines 121 in conformity to the above communication protocols. The individual ECUs 2 are, for example, as shown in FIG. 1, electronic control units for controlling the operation of the devices 3 disposed in specific areas of the vehicle C, such as at the right-front, left-front, right-rear, and left-rear areas. The devices 3 are a variety of sensors, such as vehicle-mounted cameras, which capture images of the outside of the vehicle, LIDAR (Light Detection And Ranging), and interior cameras. The devices 3 are also actuators that operate door locking/unlocking devices, door mirrors, seats, and the like. The devices 3 may also be audio devices that output entertainment-related images and sound. The devices 3 may be electronic control units.

The control of the devices 3 and various computing operations by the individual ECUs 2 can be configured for execution in the vehicle-mounted computer 1. In other words, the vehicle-mounted computer 1 can reproduce the ECUs, which control the operation of the devices 3, as virtual devices VM.

The input/output I/F 13 is an interface for communicating with the external communication device 4, the display device 5, and the like. The external communication device 4 and the display device 5 are connected to the input/output I/F 13 via wire harnesses, such as serial cables.

The external communication device 4 is a communication device with an antenna 40 for wireless communication to perform wireless communication through Internet communication networks, such as WiFi (registered trademark), 3G, LTE (registered trademark), 4G, 5G, and other mobile communication networks. The external communication device 4 is, for example, a telematics control unit (TCU). Although the external communication device 4 and the vehicle-mounted computer 1 are described as separate units in the present embodiment, the vehicle-mounted computer 1 can be configured to have the configuration or functions of the external communication device 4.

The display device 5 is an HMI (Human Machine Interface) device, such as a car navigation display, for example. The display device 5 displays data or information output from the processor 10 of the vehicle-mounted computer 1 via the input/output I/F 13.

Figure 3:
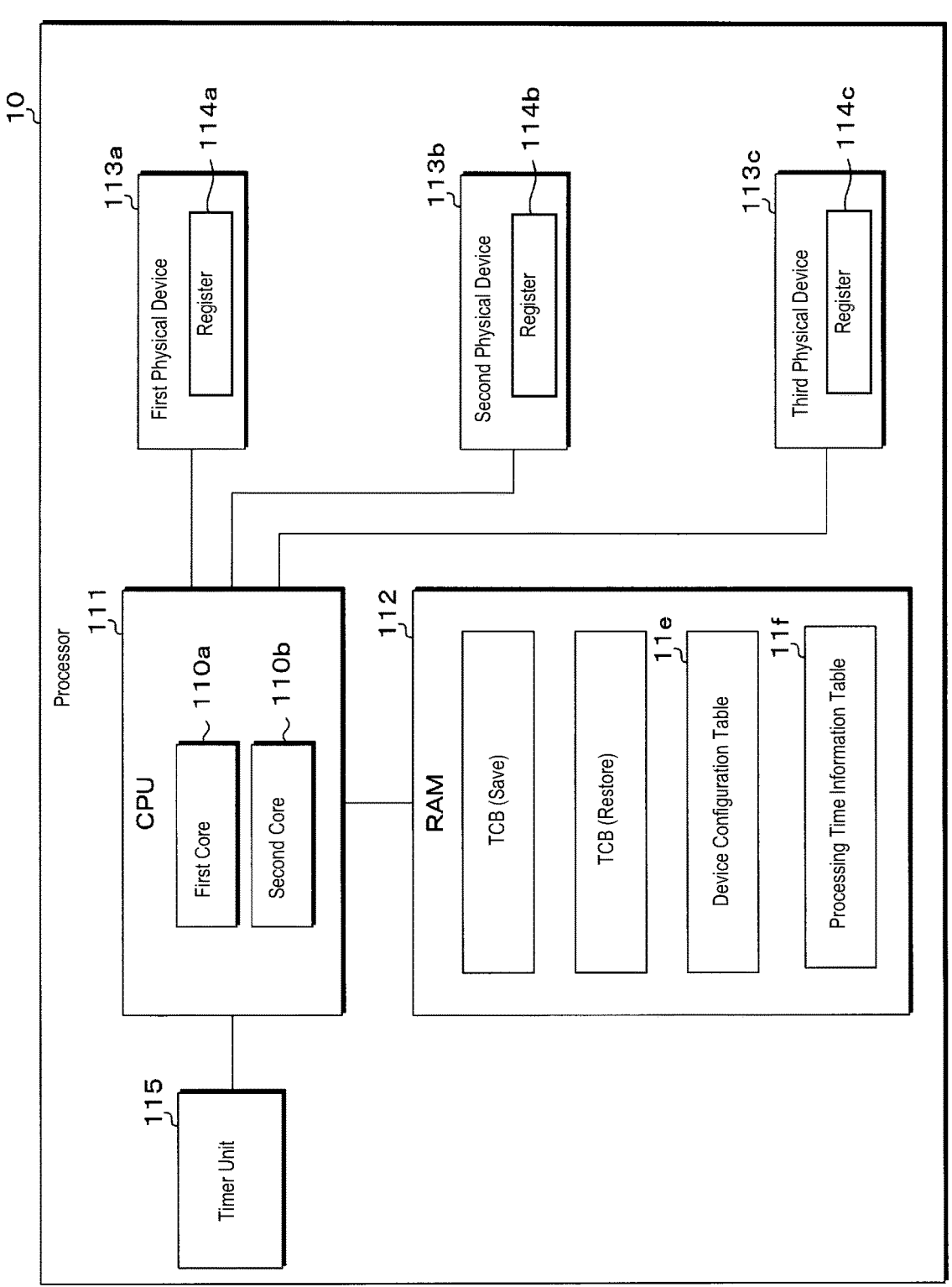
FIG. 3 is a block diagram showing an example of a configuration of a processor.

FIG. 3 is a block diagram showing an example configuration of the processor 10. The processor 10 includes a CPU (Central Processing Unit) 111, which is an arithmetic unit, a RAM (Random Access Memory) 112, a first physical device 113*a*, a second physical device 113*b*, a third physical device 113*c*, and a timer unit 115.

The CPU 111 includes a first core 110*a* and a second core 110*b*, for example. Note that the number of cores included in the CPU 111 is not particularly limited.

The first to third physical devices 113*a*, 113*b*, and 113*c* are, for example, SCBs (System Control Blocks), MPUs (Memory Protection Units), MMUs (Memory Management Units), or MPCs (Memory Protection Controllers), other peripherals, or the like. The first to third physical devices 113*a*, 113*b*, and 113*c* include at least registers 114*a*, 114*b*, and 114*c* to control the states of the respective devices.

Figure 4:
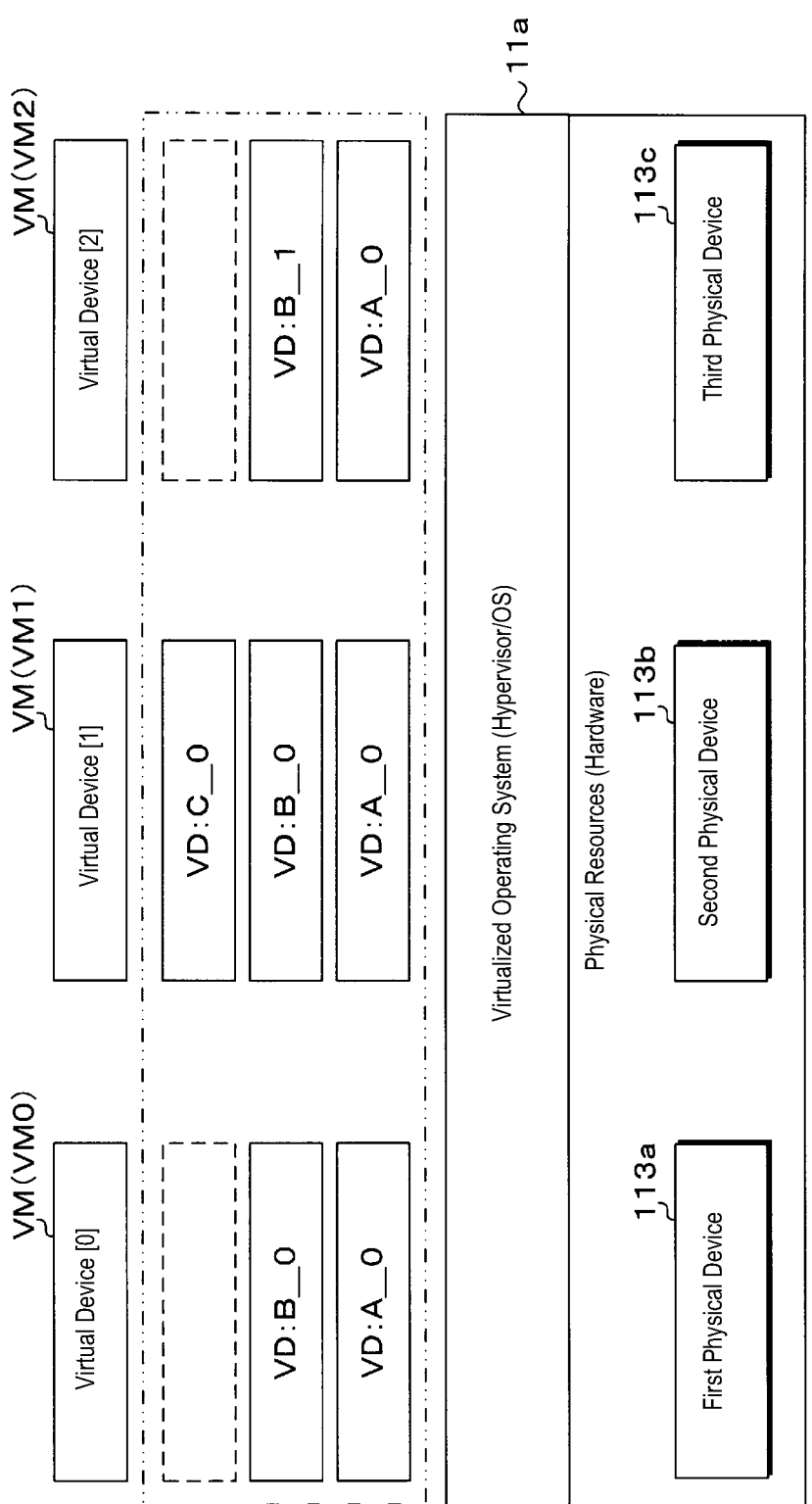
FIG. 4 is a conceptual diagram of virtual devices VM generated by a vehicle-mounted computer.

For the convenience of drawing, FIG. 4 shows a set of first to third physical devices 113*a*, 113*b*, and 113*c* used by one core, for example, the first core 110*a*, but the processor 10 further includes another set of first to third physical devices 113*a*, 113*b*, and 113*c* used by the second core 110*b*. In other words, the processor 10 includes a plurality of physical devices used by each of the plurality of cores.

The number of physical devices included in the CPU 10 is not particularly limited, either.

The RAM 112 is an example of a volatile memory device. The RAM 112 of the processor 10, which generates the virtual devices VM, stores the TCBs (Task Control Blocks) and the device configuration table 11*e*.

The TCBs contain context information relating to the virtual devices VM. The context information includes the state of CPU 111 when a certain virtual device VM is operating and executing the control program 11*c*, i.e., the values of the registers of the CPU 111 (hereinafter referred to as register values of the CPU 111 as appropriate). For example, the RAM 112 stores the context information of two virtual devices VM before and after the context switching is performed. In other words, the RAM 112 stores the context information saved from the registers of the CPU 111 and the context information restored to the registers of the CPU 111 during the context switching. More particularly, the RAM 112 stores the context information for each of the first core 110*a* and the second core 110*b*. When operating the three virtual devices VM, the RAM 112 stores the context information of the CPU 111 when it was controlling each of the virtual devices VM.

The device configuration table 11*e* is described below. The present embodiment describes the case in which the values set in the registers 114*a*, 114*b*, and 114*c* of the first to third physical devices 113*a*, 113*b*, and 113*c* during the operation of each virtual device VM (hereinafter referred to as the register values of the first to third physical devices 113*a*, 113*b*, and 113*c* as appropriate) are fixed. The RAM 112 in FIG. 3 is shown to have read out and stored the device configuration table 11*e* stored in the storage unit 11.

FIG. 4 is a conceptual diagram of the virtual devices VM generated by the vehicle-mounted computer 1, and FIG. 5 is a conceptual diagram showing an example of the device configuration table 11*e*. The virtualized operating system 11a generates three virtual devices VM, for example, as shown in FIG. 4. The virtual devices VM use all or some of the first to third physical devices 113a, 113b, and 113c. The values set in the registers 114a, 114b, and 114c of the first to third physical devices 113a, 113b, and 113c are different depending on the virtual device VM. The three blocks below the blocks indicating the first to third physical devices 113a, 113b, and 113c show the values that are set, in order starting from the bottom, in the register 114a of the first physical device 113a, the register 114b of the second physical device 113b, and the register 114c of the third physical device 113c.

In FIG. 4, "VD: A_0" indicates the value "A_0" set in the register 114a of the first physical device 113a. "VD: B_0" and "VD: B_1" indicate the values "B_0" and "B_1" set in the register 114b of the second physical device 113b. "VD: C_0" indicates the value "C_0" set in the register 114c of the third physical device 113c. The blank blocks indicated by dashed lines indicate that the third physical device 113c is not used.

Although three virtual devices VM are shown in FIG. 4, the number of virtual devices VM that operate on the virtualized operating system 11a is not limited to three.

The device configuration table 11e shown in FIG. 5 is a table that includes a "Virtual Device" column, a "First Physical Device" column, a "Second Physical Device" column, a "Third Physical Device" column, and a "Core Used in Previous Execution" column. The "Virtual Device" column stores identification data VM[0], VM[1], VM[2] . . . for identifying a plurality of virtual devices VM. The virtual device VM indicated by the identification data VM[0] will be hereinafter referred to as the virtual device VM0, the virtual device VM indicated by the identification data VM[1] as the virtual device VM1, and the virtual device VM indicated by the identification data VM[2] as the virtual device VM2.

The "First Physical Device" column indicates whether or not the corresponding virtual devices VM use the first physical device 113a, and, if so, stores the values set in the register 114a. In the example shown in FIG. 5, all the virtual devices VM use the first physical device 113a, and the same value "A_0" is set in the register 114a.

The "Second Physical Device" column indicates whether or not the corresponding virtual devices VM use the second physical device 113b and, if so, stores the values set in the register 114b. In the example shown in FIG. 5, all the virtual devices VM use the second physical device 113b, and the value set in the registers 114a and 114b for the virtual devices VM0 and VM1 is "B_0", and the value set in the register 114c for the virtual device VM2 is "B_1.

The "Third Physical Device" column indicates whether or not the corresponding virtual devices VM use the third physical device 113c, and if so, stores the values set in the register 114c. In the example shown in FIG. 5, one virtual device, the virtual device VM2, uses the third physical device 113c, and the value set in the register 114b of the virtual device VM2 is "C_0". The term "Not Applicable" indicates that the third physical device 113c is not used.

The "Core Used in Previous Execution" column stores information indicating the core on which the corresponding virtual device VM was operated the previous time. For example, in the example shown in FIG. 5, information is stored that indicates that the virtual devices VM0 and VM1 operated on the first core 110a the previous time and the virtual device VM2 operated on the second core 110b the previous time.

Note that, at the time of initial execution, since no previous execution core exists, dummy data may be stored that indicates the previous execution took place on a predetermined core.

FIG. 6a and FIG. 6b are conceptual diagrams showing examples of the setting values of the second physical device 113b. FIG. 6A shows the values "B_0" set in the register 114b of the second physical device 113b, and FIG. 6B shows the values "B_1" set in the register 114b of the second physical device 113b. "Identifier (Address)" indicates the addresses of the register 114b, and "Setting Value" is the value set in the register 114b specified by each address.

The following describes the processing time information table 11f. The processing time information table 11f stores the processing time required to migrate the virtual device VM that was operating on the first core 110a to the second core 110b, and the processing time required to migrate the virtual device VM that was operating on the second core 110b to the first core 110a.

The processing time information table 11f also stores the processing time required to change the register values of the first to third physical devices 113a, 113b, and 113c when mutually switching virtual devices VM that operate on the first core 110a or the second core 110b.

Figure 7:
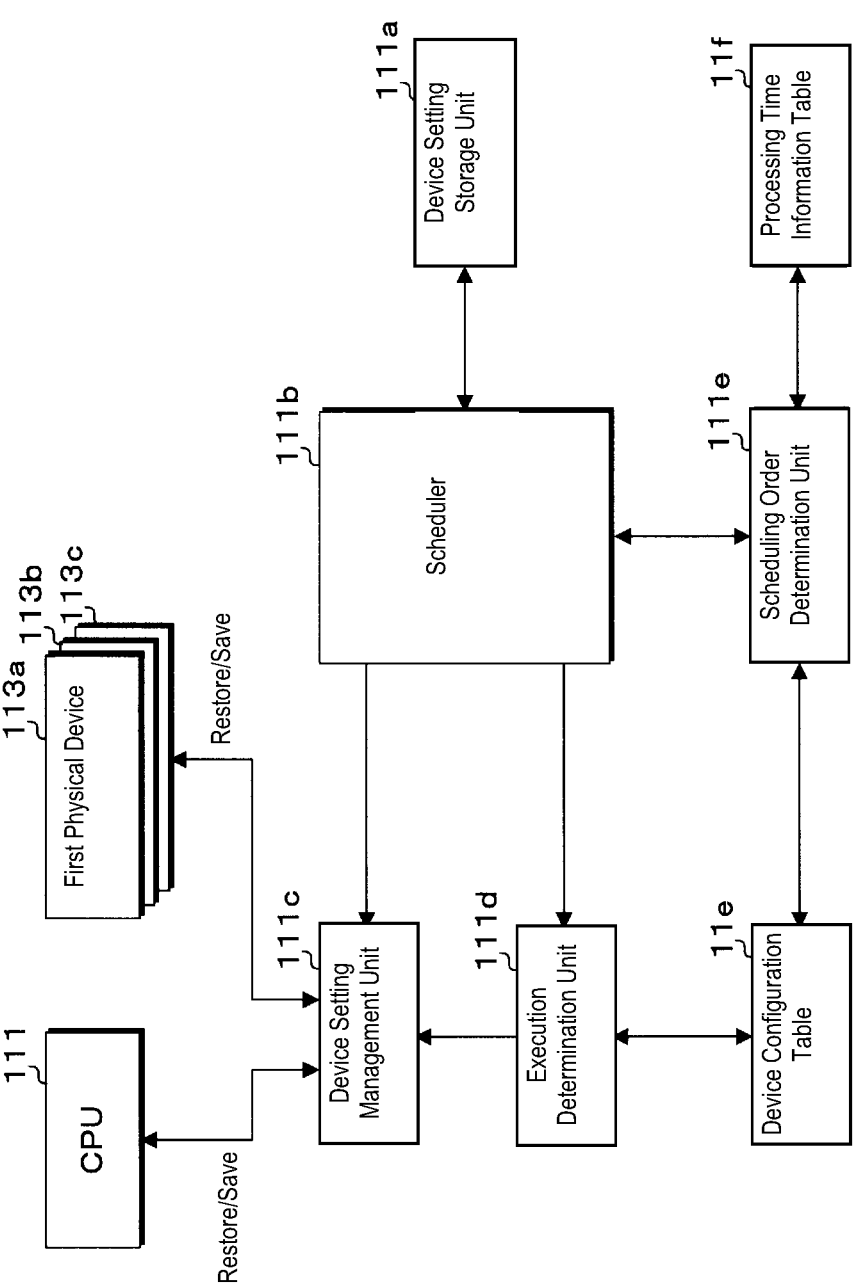

FIG. 7 is a functional block diagram relating to context switching and the like of the present embodiment. The vehicle-mounted computer 1 includes a device setting storage unit 111a, a scheduler 111b, a device setting management unit 111c, an execution determination unit 111d, and a scheduling order determination unit 111e as functional units.

The device setting storage unit 111a is a functional unit that stores TCBs or context information. The device setting storage unit 111a stores as context information the register values of the CPU 111 relating to the virtual devices VM, or specifically, the register values of the first and second cores 110a, 110b relating to the plurality virtual devices VM. More specifically, when switching the virtual devices VM operated by the CPU 111, the device setting storage unit 111a saves the register values of the first core 110a that was controlling the operating virtual device VM and stores them as context information. Similarly, the values of the registers of the second core 110b that was controlling the operating virtual device VM are saved and stored as context information.

In response to a query from the scheduler 111b, the device setting storage unit 111a returns the context information stored by the device setting storage unit 111a, that is, the values of the registers of the CPU 111 relating to the virtual devices VM that will operate next by context switching, or more specifically, the values of the registers of the first and second cores 110a, 110b. The main hardware that constitutes the device setting storage unit 111a is the RAM 112.

The scheduler 111b is a functional unit that controls the allocation and switching of hardware resources of the CPU 111 with respect to the virtual devices VM. In other words, the scheduler 111b is the functional unit that manages the order in which the plurality of virtual devices VM are allocated to the first core 110a or second core 110b and executed by context switching.

The first and second cores 110a, 110b execute processing relating to the respective virtual devices VM allocated thereto. The processing relating to a virtual device VM includes processing for emulating a virtual processor, a virtual memory, a virtual communication unit, and the like that constitute the virtual device VM, as well as processing for operating the guest OS 11b and the control program 11c.

The scheduler 111B switches the virtual devices VM so that the processing relating to the virtual devices VM that require responsiveness is periodically executed at a predetermined period. The virtual devices VM that require responsiveness are, for example, devices that handle functions or data associated with an ASIL (Automotive Safety Integrity Level) based on an automotive functional safety standard (ISO 26262).

As for the processing relating to the virtual devices VM that do not require responsiveness, however, the scheduler 111b switches the virtual devices VM so that they are executed non-periodically by whichever of the first and second cores 110a and 110b has sufficient processing capacity. In other words, if the first and second cores 110a, 110b, have sufficient capacity to allow other virtual devices VM to operate after allowing the virtual devices VM that require responsiveness to operate within a predetermined period, they allow virtual devices VM that do not require responsiveness to operate thereon. The virtual devices VM that do not require responsiveness are, for example, devices that handle functions or data associated with the QM (Quality Management) level based on an automotive functional safety standard.

Information indicating a virtual device VM before context switching, that is, an operating virtual device VM, will be hereinafter referred to as first virtual device information, and information indicating a virtual device VM after context switching, that is, a virtual device VM that is to operate next, will be hereinafter referred to as second virtual device information.

The scheduler 111b provides the first virtual device information and the second virtual device information relating to the first and second cores 110a, 110b to the execution determination unit 111d. The scheduler 111b also uses the second virtual device information relating to the first and second cores 110a, 110b to query the device setting storage unit 111a for the context information about the virtual devices VM indicated by the second virtual device information, and acquires the context information output from the device setting storage unit 111a. The scheduler 111b provides the acquired context information to the device setting management unit 111c.

Note that the main hardware that constitutes the scheduler 111b is the CPU 111 and the timer unit 115.

The execution determination unit 111d acquires the first virtual device information and the second virtual device information provided by the scheduler 111b, refers to the device configuration table 11e based on the acquired first and second virtual device information, and reads the setting values of the registers 114a, 114b, and 114c of the first to third physical devices 113a, 113b, and 113c associated with the virtual devices VM before and after the context switching relating to the first and second cores 110a and 110b. Then, the execution determination unit 111d determines whether or not the setting values of the registers 114a, 114b, and 114c of the first to third physical devices 113a, 113b, and 113c need to be changed when switching the virtual devices VM of the first and second cores 110a, 110b, and provides device information based on the results of the determination to the device setting management unit.

If it is determined that the setting values of the registers 114a, 114b, and 114c of the first to third physical devices 113a, 113b, and 113c do not have to be changed, the device information includes information indicating that no setting change is required. If it is determined that the setting values of the registers 114a, 114b, and 114c of the first to third physical devices 113a, 113b, and 113c need to be changed, the device information includes the identifiers and the setting values of the registers 114a, 114b, and 114c of the first to third physical devices 113a, 113b, and 113c that require changes in the setting values. Note that the main hardware that constitutes the execution determination unit 111d is the CPU 111.

The device setting management unit 111c acquires the context information provided by the scheduler 111b, saves the register values of the CPU 111, i.e., the first and second cores 110a and 110b, and restores the acquired context information. In other words, the device setting management unit 111c restores the context information by storing the register values of the first and second cores 110a and 110b before context switching in the device setting storage unit 111a as the context information of the first and second cores 110a and 110b relating to the operating virtual devices VM, and then setting the context information acquired from the scheduler 111b, that is, the register values of the first and second cores 110a and 110b relating to the virtual devices VM after context switching, in the registers of the first and second cores 110a and 110b.

The device setting management unit 111c acquires the device information provided by the execution determination unit 111d, and, if the acquired device information indicates that no setting change is required, terminates the processing relating to the context switching without changing the settings of the registers 114a, 114b, and 114c of the first to third physical devices 113a, 113b, and 113c. The CPU 111 immediately starts executing the processing relating to the virtual devices VM after context switching without rewriting the registers 114a, 114b, and 114c of the first to third physical devices 113a, 113b, and 113c.

On the other hand, if the acquired device information indicates the identifiers and the setting values of the registers 114a, 114b, and 114c of the specific first to third physical devices 113a, 113b, and 113c that require setting changes, the device setting management unit 111c uses these identifiers and setting values to change the setting values of the registers 114a, 114b, and 114c of the first to third physical devices 113a, 113b, and 113c. The CPU 111 rewrites the registers of the CPU 111 and the registers 114a, 114b, and 114c of the specific first to third physical devices 113a, 113b, and 113c that require setting changes, and starts to execute the processing relating to the virtual devices VM after the context switching.

The device setting management unit 111c executes the processing relating to the change of the register values of the first to third physical devices 113a, 113b, and 113c for each of the first and second cores 110a and 110b.

In addition, the device setting management unit 111c writes to the device configuration table 11e the identification data that indicates the virtual devices VM operating on the first core 110a and the second and 110b and the information that indicates the core on which each of the virtual devices VM was operating before the context switching by associating the identification data with the information.

The main hardware that constitutes the device setting management unit 111c is the CPU 111.

The scheduling order determination unit 111e refers to the device configuration table 11e and the processing time information table 11f to determine the order of switching the virtual devices VM to which the hardware resources of the CPU 111 are to be allocated through time-division.

Specifically, the scheduling order determination unit 111e determines, for all candidate virtual devices VM for the order of switching, whether or not migration occurs between the first and second cores 110a, 110b, and whether or not setting changes are required in the first to third physical devices 113*a*, 113*b*, and 113*c* used by the virtual devices VM before and after context switching. Then, the scheduling order determination unit 111*e* refers to the processing time information table 11*f* to determine the order of switching the virtual devices VM with the smallest total sum of the processing time relating to changing the register values of the first to third physical devices 113*a*, 113*b*, and 113*c* and the processing time relating to migration. The scheduling order determination unit 111*e* then gives the scheduler 111*b* schedule information indicating the determined order of switching the virtual devices VM.

The scheduler 111*b* acquires the schedule information output from the scheduling order determination unit 111*e* and executes the processing of switching the virtual devices VM according to the order of switching virtual devices VM indicated by the acquired schedule information.

As described above, according to the device setting storage unit 111*a*, the scheduler 111*b*, the device setting management unit 111*c*, the execution determination unit 111*d*, and the scheduling order determination unit 111*e*, when switching virtual devices VM and allocating hardware resources of the CPU 111, the processing load relating to changing the register values of the first to third physical devices 113*a*, 113*b*, and 113*c* and the processing load relating to migration can be taken into consideration to schedule the virtual devices VM so that the processing load is reduced for efficient switching.

Figure 8:
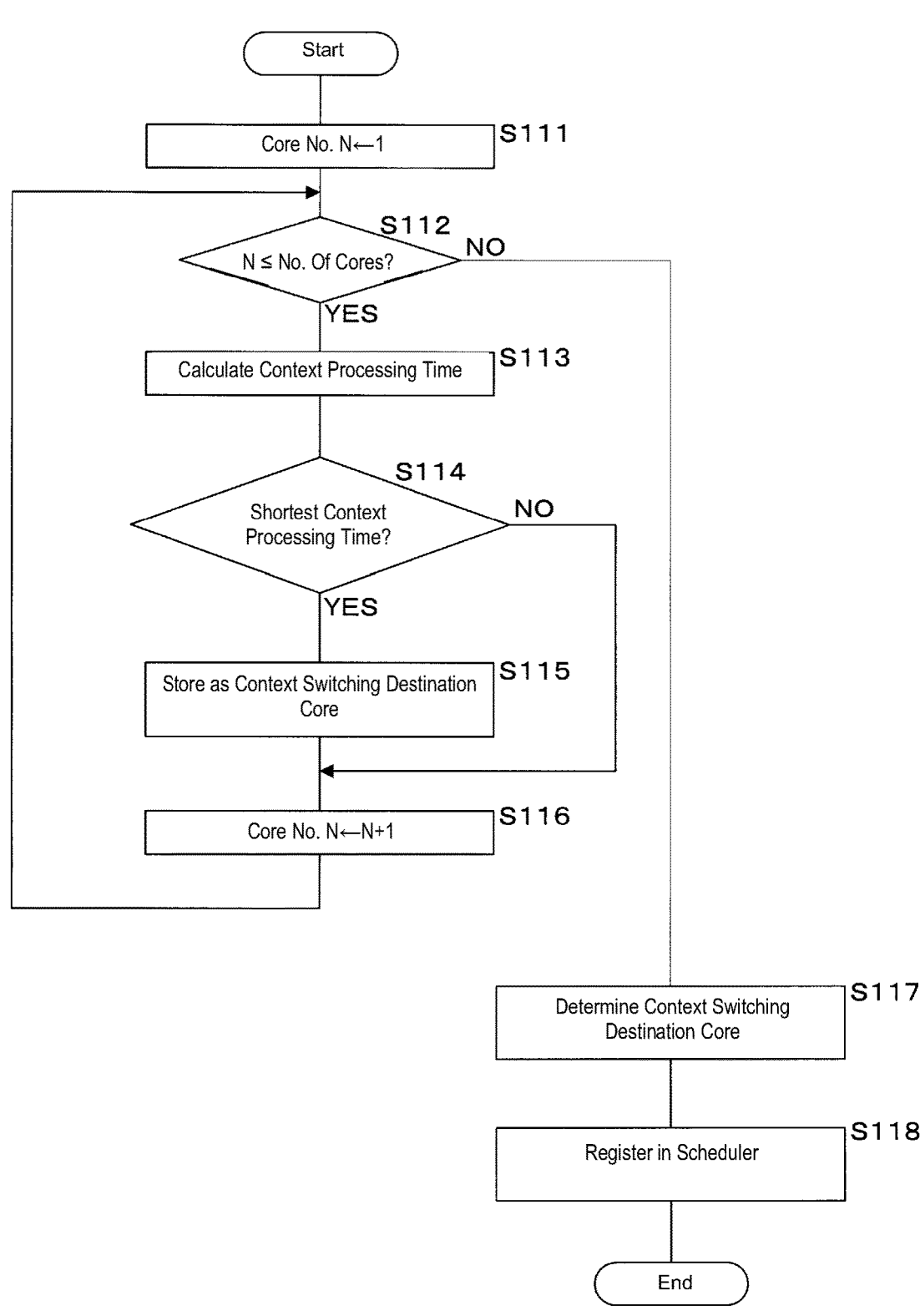
FIG. 8 is a flowchart showing a procedure for scheduling.
Figure 9:
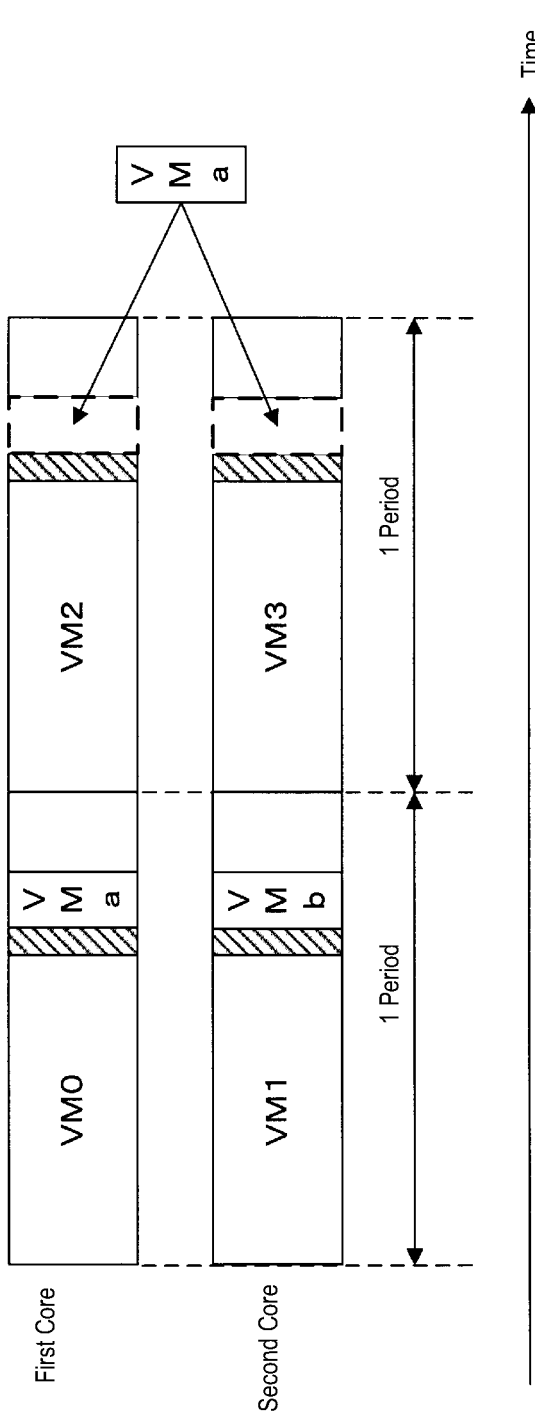
FIG. 9 is an explanatory view showing a state partway through scheduling.
Figure 11:
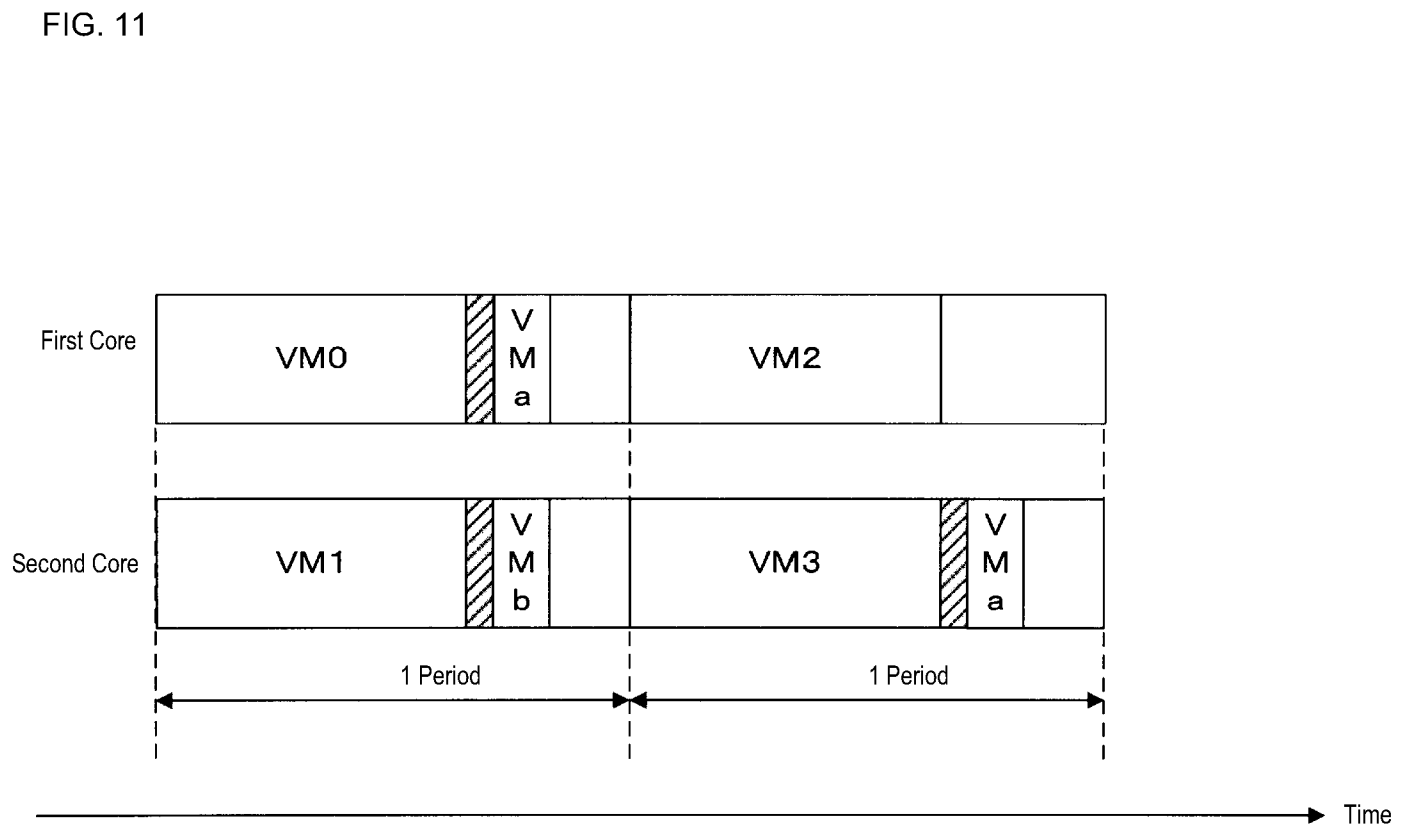

FIG. 8 is a flowchart showing a procedure for scheduling, FIG. 9 is an explanatory view showing a state partway through scheduling, FIG. 10 is a chart showing the processing load relationship, and FIG. 11 is an explanatory view showing a method of scheduling.

The processor 10 executes the following processing when operating a virtual device VM that operates non-periodically (hereinafter referred to as a virtual device VMa). In FIG. 10, the horizontal arrows indicate the flow of time. VM0, VM1, VM2, and VM3 indicate the virtual devices VM requiring responsiveness that are allocated to the first and second cores 110*a*, 110*b*, and that the processing relating to each device is executed periodically each predetermined period. The first core 110*a* executes processing relating to the two virtual devices VM indicated by VM0 and VM2 each predetermined period. The second core 110*b* executes processing relating to the two virtual devices VM indicated by VM1 and VM3 each predetermined period.

The hatched segments indicate the processing relating to the context switching of the virtual devices VM and setting changes in the register values of the first to third physical devices 113*a*, 113*b*, and 113*c*.

The virtual device VMa is a virtual device VM that does not require responsiveness and is allocated non-periodically to whichever of the first and second cores 110*a* and 110*b* has spare capacity to execute processing. In FIG. 9, since the first and second cores 110*a* and 110*b* both have spare capacity, it is necessary to determine on which core the virtual device VMa is to be executed and schedule it.

The following describes the processing for determining the context switching destination of the virtual device VMa. First, the processor 10 substitutes 1 for a core number N, which is a variable (step S111). Next, the processor 10 determines whether or not the variable N is less than or equal to the number of cores of the processor 10 (step S112). If it is determined that the variable N is less than or equal to the number of cores (step S112: YES), the processor 10 calculates the processing time relating to the context switching and the like with consideration given to the processing load for the migration of the virtual device VM and the setting change of the first to third physical devices 113*a*, 113*b*, and 113*c* (step S113).

Specifically, by referring to the device configuration table 11*e*, as shown in FIG. 10, the processor 10 can determine whether or not migration occurs between the first and second cores 110*a* and 110*b*, and whether or not the register values of the first to third physical devices 113*a*, 113*b*, and 113*c* need to be changed. The processor 10 can then determine the processing time required for migration and changing the register value settings by referring to the processing time information table 11*f*, and calculate the total sum of the processing time required for context switching to the first core 110*a* or the second core 110*b* as the processing time for context switching and the like.

Then, the processor 10 determines whether or not the time for context processing calculated in step S113 is the shortest (step S114). The processor 10 is configured to execute the processing from step S112 to step S116 for each of the plurality of cores to calculate the time for context processing, and in step S114, the processor 10 determines whether or not the context processing time calculated this time is the shortest context processing time among the context processing times calculated thus far in the repeated processing.

If it is determined to be the shortest context processing time (step S114: YES), the processor 10 stores, in the primary storage, the first core 110*a* or the second core 110*b* indicated by the variable N, as the context switching destination core on which the virtual device VM is to be executed next (step S115).

When the processing in step S115 is completed, or if it is determined in step S114 that the processing time for context switching and the like is not the shortest (step S114: NO), the processor 10 increments the variable N by 1 and returns the processing to step S112.

If it is determined in step S112 that the variable N is not less than or equal to the number of cores (step S112: NO), the processor 10 determines the core with the shortest processing time for context switching and the like as the context switching destination core (step S117). Then, the processor 10 schedules the first core 110*a* or the second core 110*b* as the context switching destination of the virtual device VM (step S118) and terminates the processing.

In the example shown in FIG. 10, the processing time for context switching to the first core 110*a* and the like is T1 and the processing time for context switching to the second core 110*b* and the like is T2. As an example, here, T1 is assumed to be greater than T2. Note that as long as T1 and T2 are data indicating the length of the processing time, the unit and method of expression are not limited in any way, and that absolute values of processing time need not be stored as long as the processing time can be compared.

In this case, the processor 10 selects the second core 110*b*, which has the shortest processing time for context switching, as the context switching destination core, and schedules it. Executing the virtual device VMa on the second core 110*b* makes the processing load smaller to enable more efficient context switching.

As described above, according to the vehicle-mounted computer 1, the computer execution method, and the computer program 11*d* of the present embodiment, it is possible to efficiently determine the context switching destination of a virtual device VM such that the total sum of the processing time relating to performing a setting change of the register values of the first to third physical devices 113*a*, 113*b*, and 113*c* and migration is minimized.

Although the present embodiment describes an example in which the processing time required for changing the settings of the first to third physical devices 113*a*, 113*b*, and 113*c* and migration is calculated by referring to the processing time information table 11*f*, the present embodiment may be configured to evaluate the magnitude of the processing cost based on the information in the device configuration table 11*e* so as to determine the context switching destination core.

For example, if both migration and device setting change are required, the processing load is evaluated as maximum. If neither migration nor device setting change is required, the processing load is evaluated as minimum. If one of migration and device setting change is required, the processing load is evaluated as medium. However, the processing load when device configuration change is not required but migration is required is evaluated as smaller than the processing load when migration is not required but device configuration change is required. The processor 10 can evaluate the magnitude of the processing load and determine the context switching destination core according to predetermined rules.

In addition, after operating the virtual devices VM with high priority levels periodically at a predetermined period, the processor 10 can then determine the context switching destination of the virtual devices VM with low priority levels, upon considering whether or not migration occurs and the amount of change in the register values of the first to third physical devices 113*a*, 113*b*, and 113*c*.

Furthermore, by referring to the device configuration table 11*e*, the processor 10 can determine the context switching destination with the smallest total sum of the processing cost required to change the register values of the first to third physical devices 113*a*, 113*b*, and 113*c* and the processing cost required to change the core on which a virtual device VM is to operate.

Furthermore, the processor 10 can also determine the context switching destination with the smallest total sum of the processing time needed for changing the register values of the first to third physical devices 113*a*, 113*b*, and 113*c* and the processing time needed for changing the core on which a virtual device VM is to operate.

Note that although the present embodiment has described an example of constructing a virtual environment using a hypervisor-type virtualized operating system 11*a*, a virtual environment can also be built using host OS-type virtualization software, i.e., virtualization software that runs on a basic OS.

Moreover, the embodiment has described a case where the contents of the device configuration table 11*e* are fixed, but the register values of the first to third physical devices 113*a*, 113*b*, and 113*c* used by the plurality of virtual devices VM may be changed dynamically. In this case, the processor 10 may save the register values of the first to third physical devices 113*a*, 113*b*, and 113*c* when performing context switching, and restore the configuration values that were saved the previous time by setting them in the registers 114*a*, 114*b*, and 114*c*.

The invention claimed is:

1. A vehicle-mounted computer that includes a physical resource including a processor with a plurality of cores and a physical device with a register and generates a plurality of virtual devices by allocating the physical resource through time-division, wherein the processor:

causes at least one virtual device of the plurality of virtual devices to operate on each of the plurality of cores periodically at a predetermined period and causes another virtual device of the plurality of virtual devices to operate non-periodically;

stores at least the core on which the other virtual device operated; and determines, if the other virtual device is to operate next, the core on which the other virtual device is to operate, based on whether or not the core on which the other virtual device is to operate will be changed and a change amount of a register value of the physical device.

2. The vehicle-mounted computer according to claim 1, wherein the processor is configured to cause the other virtual device to operate after causing the at least one virtual device to operate in the predetermined period.

3. The vehicle-mounted computer according to claim 2, further including, a device configuration table that includes register values set in the physical device used by each of the plurality of virtual devices, and information indicating the cores on which the plurality of virtual devices operated, wherein by referring to the device configuration table, the processor determines the core with the smallest total sum of a processing cost needed for changing the register values of the physical device and a processing cost needed for changing the core on which the virtual device is to operate, as the core on which the other virtual device is to operate.

4. The vehicle-mounted computer according to claim 2, further including, a storage unit for storing processing time needed for changing the register value of the physical device and processing time needed for changing the core on which the virtual device is to operate, wherein the processor determines the core with the smallest total sum of processing time needed for changing the register values of the physical device and processing time needed for changing the core on which the virtual device is to operate, as the core on which the other virtual device is to operate.

5. The vehicle-mounted computer according to claim 2, wherein the virtual device that is caused to operate periodically is a device that handles a function or data associated with an ASIL (Automotive Safety Integrity Level), and the virtual device that is caused to operate non-periodically is a device that handles a function or data associated with a QM (Quality Management) level.

6. The vehicle-mounted computer according to claim 1, further including, a device configuration table that includes register values set in the physical device used by each of the plurality of virtual devices, and information indicating the cores on which the plurality of virtual devices operated, wherein by referring to the device configuration table, the processor determines the core with the smallest total sum of a processing cost needed for changing the register values of the physical device and a processing cost needed for changing the core on which the virtual device is to operate, as the core on which the other virtual device is to operate.

7. The vehicle-mounted computer according to claim 6, further including, a storage unit for storing processing time needed for changing the register value of the physical device and processing time needed for changing the core on which the virtual device is to operate, wherein the processor determines the core with the smallest total sum of processing time needed for changing the register values of the physical device and processing time needed for changing the core on which the virtual device is to operate, as the core on which the other virtual device is to operate.

8. The vehicle-mounted computer according to claim 6, wherein the virtual device that is caused to operate periodically is a device that handles a function or data associated with an ASIL (Automotive Safety Integrity Level), and the virtual device that is caused to operate non-periodically is a device that handles a function or data associated with a QM (Quality Management) level.

9. The vehicle-mounted computer according to claim 1, further including, a storage unit for storing processing time needed for changing the register value of the physical device and processing time needed for changing the core on which the virtual device is to operate, wherein the processor determines the core with the smallest total sum of processing time needed for changing the register values of the physical device and processing time needed for changing the core on which the virtual device is to operate, as the core on which the other virtual device is to operate.

10. The vehicle-mounted computer according to claim 9, wherein the virtual device that is caused to operate periodically is a device that handles a function or data associated with an ASIL (Automotive Safety Integrity Level), and the virtual device that is caused to operate non-periodically is a device that handles a function or data associated with a QM (Quality Management) level.

11. The vehicle-mounted computer according to claim 1, wherein the virtual device that is caused to operate periodically is a device that handles a function or data associated with an ASIL (Automotive Safety Integrity Level), and the virtual device that is caused to operate non-periodically is a device that handles a function or data associated with a QM (Quality Management) level.

12. A computer execution method to be performed by a vehicle-mounted computer that includes a physical resource including a processor and a non-transitory, machine-readable medium storing instructions, the processor including a plurality of cores, and the vehicle-mounted computer further includes a physical device with a register and generates a plurality of virtual devices by allocating the physical resource through time-division, the processor executing the instructions to perform the steps comprising:

causing at least one virtual device of the plurality of virtual devices to operate on each of the plurality of cores periodically at a predetermined period and causing another virtual device of the plurality of virtual devices to operate non-periodically;

storing at least the core on which the other virtual device operated; and determining, if the other virtual device is to be caused to operate next, the core on which the other virtual device is to operate, based on whether or not the core on which the other virtual device is to operate will be changed and a change amount of a register value of the physical device.

13. A computer program product comprising a non-transitory, machine-readable medium storing instructions which when executed by a vehicle-mounted computer having a physical resource including a processor with a plurality of cores and a physical device with a register and generates a plurality of virtual devices by allocating the physical resource through time-division, to execute processing for:

causing at least one of the plurality of virtual devices to operate on each of the plurality of cores periodically at a predetermined period and causing another virtual device of the plurality of virtual devices to operate non-periodically;

storing at least the core on which the other virtual device operated; and determining, if the other virtual device is to be caused to operate next, the core on which the other virtual device is to operate, based on whether or not the core on which the other virtual device is to operate will be changed and a change amount of a register value of the physical device.

\* \* \* \* \*